United States Patent
Hoogerbrugge

(10) Patent No.: US 11,023,344 B2
(45) Date of Patent: Jun. 1, 2021

(54) DATA PROCESSING SYSTEM HAVING A MONITORING SYSTEM AND METHOD FOR MONITORING

(71) Applicant: NXP B.V., Eindhoven (NL)

(72) Inventor: Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/659,937

(22) Filed: Oct. 22, 2019

(65) Prior Publication Data

US 2021/0117301 A1    Apr. 22, 2021

(51) Int. Cl.
*G06F 11/30* (2006.01)
*G06F 11/32* (2006.01)
*G06F 21/60* (2013.01)
*G06N 20/00* (2019.01)
*G06K 9/62* (2006.01)

(52) U.S. Cl.
CPC ........ *G06F 11/3041* (2013.01); *G06F 11/327* (2013.01); *G06F 21/602* (2013.01); *G06K 9/6256* (2013.01); *G06N 20/00* (2019.01)

(58) Field of Classification Search
CPC .. G06F 11/3041; G06F 11/327; G06F 21/602; G06N 20/00; G06K 9/6256
See application file for complete search history.

(56) References Cited

U.S. PATENT DOCUMENTS

| | | | | |
|---|---|---|---|---|
| 10,613,875 | B1* | 4/2020 | Lysaght | G05B 19/042 |
| 2019/0102244 | A1* | 4/2019 | Tarlano | G06N 5/022 |
| 2019/0237083 | A1* | 8/2019 | Allen | G09B 7/00 |
| 2019/0240059 | A1* | 8/2019 | Seres | G16H 10/60 |
| 2019/0246075 | A1* | 8/2019 | Khadloya | G06N 3/0427 |
| 2019/0308656 | A1* | 10/2019 | Shin | B62D 15/021 |
| 2019/0377305 | A1* | 12/2019 | Petrus | G05B 13/041 |

OTHER PUBLICATIONS

Keevers, Thomas L.; "Cross-validation is insufficient for model validation;" Joint and Operations Analysis Division, Defence Science and Technology Group, Australian Government Department of Defence Science and Technology; DST-Group-TR-3576; Published Victoria, Australia; Mar. 2019.
Perez-Ortiz, Maria et al.; "A Review of Classification Problems and Algorithms in Renewable Energy Applications;" Published Aug. 2, 2016 MDPI, Basel, Switzerland; Energies 2016, 9, 607; DOI:10.3390/en9080607; www.mdpi.com/journal/energies.

* cited by examiner

*Primary Examiner* — Henry Tsai
*Assistant Examiner* — Christopher A Daley
(74) *Attorney, Agent, or Firm* — Daniel D. Hill

(57) ABSTRACT

A data processing system includes a monitoring system, the monitoring system includes a processor and a data analysis block. The processor executes a monitoring application for monitoring an operation of a monitored system coupled to the monitoring system. When assistance is needed from the monitored system, the processor has an output coupled to the monitored system for providing an assistance request. When the assistance request is sent to the monitored system, the processor also sends a disturbance indication to the data analysis block. The disturbance indication indicates that the output data from the monitored system may be disturbed by the assistance request. The data analysis block can then take an action to reduce the effect the disturbance may have on the analysis results. A method for monitoring the monitored system is also provided.

20 Claims, 4 Drawing Sheets

DATA PROCESSING SYSTEM HAVING A MONITORING SYSTEM AND METHOD FOR MONITORING

BACKGROUND

Field

This disclosure relates generally to system monitoring, and more particularly, to a monitoring system for a data processing system and method for monitoring.

Related Art

Machine learning is becoming more widely used in many of today's applications, such as applications involving forecasting and classification. Generally, a machine learning (ML) model is trained, at least partly, before it is used. Training data is used for training an ML model. Machine learning models may be classified by how they are trained. Supervised learning, unsupervised learning, semi-supervised learning, and reinforcement learning are examples of training techniques. One application involving the use of ML models is for monitoring the operation of a system. However, depending on the system, it may be difficult to monitor the operation of the system without disturbing the system being monitored. The disturbance can influence results provided by the ML model both during training and inference operation.

Therefore, a need exists for a method and monitoring system for monitoring the operation of a data processing system that addresses the above problem.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
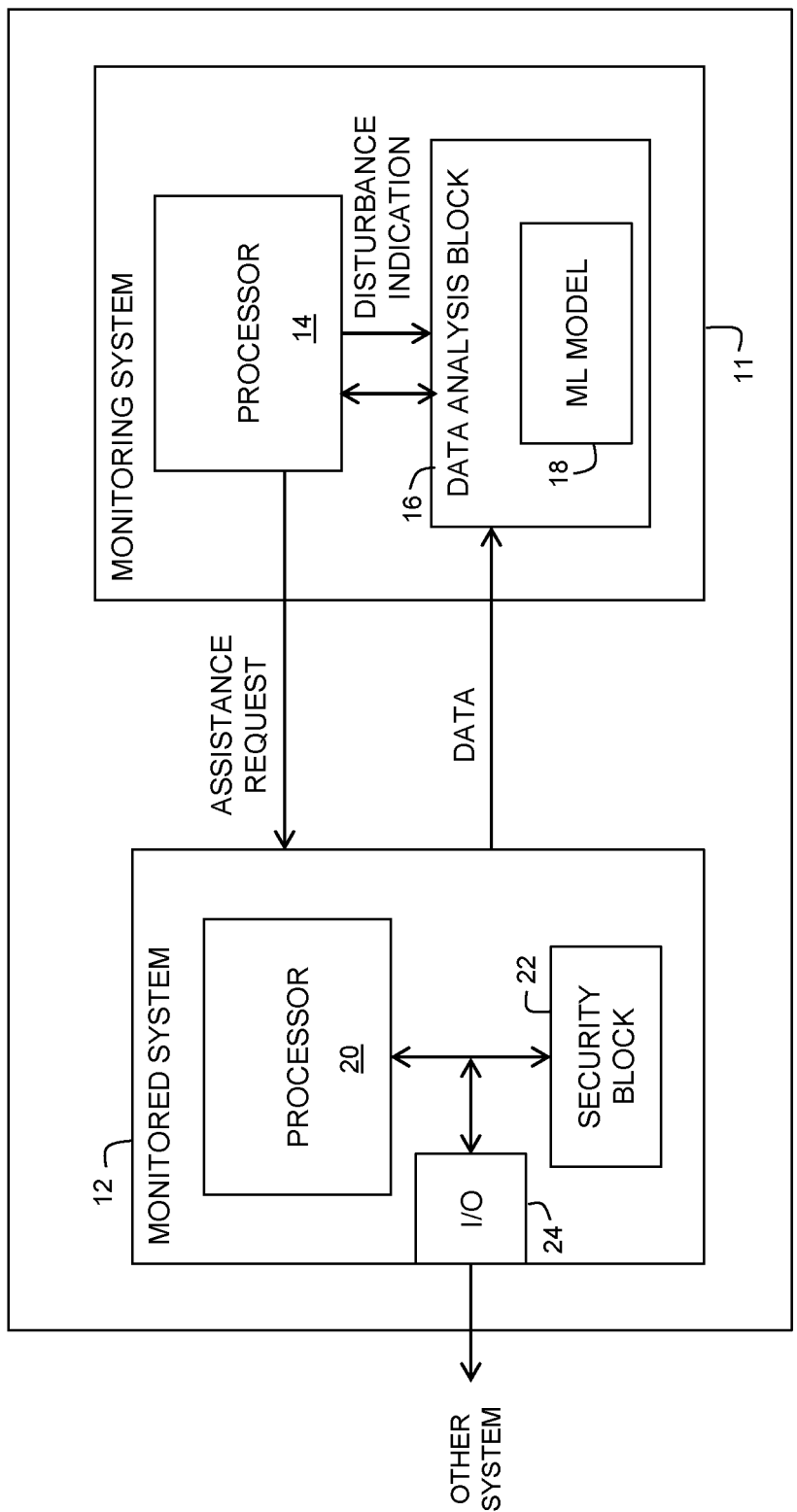
FIG. 1 illustrates a data processing system in accordance with an embodiment.

Generally, there is provided, a method and monitoring system for monitoring the operation of a monitored system. The monitoring system may include a ML model. The monitoring system monitors output data from the monitored system. The output data is analyzed by the ML model. The ML model may generate a summary of the results that is sent to, e.g., an externally provided service accessible over a network. From time-to-time, the monitoring system may require assistance from the monitored system and therefore may provide an assistance request signal to the monitored system. However, the assistance that is provided may result in distortions in the output data from the monitored system. The distortions, or disturbances, in the output data may influence the training and/or inference operation of the ML model, causing the ML model results to be less accurate. To mitigate the effects of the distortion, or disturbance, the ML model includes an input from a processor of the monitoring system to inform the ML model with a disturbance indication when the monitored system is being disturbed by assertion of the assistance request signal. The disturbance indication may be a binary value such as a logic one or a logic zero to indicate to the ML model if the received input from the monitored system is being disturbed or not. Also, the disturbance indication signal may include an indication regarding whether the monitored system is being disturbed a little, or a lot. For example, the signal may include a percentage indication of the percentage of the observation period that the output data from the monitored system was disturbed. Also, there may be several types of disturbance indications that each require a different response to mitigate. The accuracy of the ML model during both training and inference operation can be improved by lessening the effects of the disturbance in this way.

In accordance with an embodiment, there is provided, a data processing system comprising a monitoring system, the monitoring system including: a processor for executing a monitoring application for monitoring an operation of a monitored system coupled to the monitoring system, the processor having an output coupled to the monitored system for providing an assistance request; and a data analysis block coupled to receive output data from the monitored system, and coupled to receive a disturbance indication from the processor, wherein the disturbance indication is provided in response to the processor providing the assistance request to the monitored system, wherein the disturbance indication indicating that the output data from the monitored system is being disturbed by the assistance request. The disturbance indication may further include an indication indicating how much the output data is being disturbed. The indication indicating how much the output data is being disturbed may further include an indication indicating how much of an observation period of the output data that the output data is being disturbed. The data analysis block may further include a machine learning model, the disturbance indication may be receivable by the machine learning model during both a training phase and an inference phase of the machine learning model. The monitoring system and the monitored system may both be implemented together on a single integrated circuit. The disturbance indication may further include an indication of a type of assistance requested by the monitoring system. The assistance request may include a request to communicate externally from the monitored system through an input/output circuit of the monitored system. The external communications from the monitored system may be encrypted.

In another embodiment, there is provided, a method for monitoring operation of a system, the method including: receiving data from the monitored system at a monitoring system; collecting and analyzing the data from the monitored system using a data analysis block of the monitoring system; providing a request for assistance to the monitored system from a processor of the monitoring system; and providing a disturbance indication to the data analysis block from the processor in response to the request for assistance being provided to the monitored system to indicate that the data received from the monitored system is being disturbed by the request for assistance. The data analysis system may further include a machine learning model, the method further including analyzing the data from the monitored system using the machine learning model. The method may further include training the machine learning model using the data from the monitored system. Providing the disturbance indication may further include providing an indication of how much the data received from the monitored system is being disturbed. The disturbance indication further includes an indication of a type of assistance requested by the monitoring system. Providing the request for assistance may further include requesting communications external to the monitoring system through the monitored system. The monitored system and the monitoring system may be implemented on a single integrated circuit.

In yet another embodiment, there is provided, a data processing system including: a system for performing a function; and a monitoring system coupled to monitor output data from the system for performing the function, the monitoring system comprising: a processor having an output for providing an assistance request to the monitored system; and a data analysis block comprising a machine learning model, the machine learning model being provided to analyze the output data, the data analysis block coupled to the processor and coupled to receive the output data from the monitored system, wherein in response to the processor providing the assistance request to the monitored system, the data analysis block receiving a disturbance indication from the processor to indicate to the machine learning model that the output data is being disturbed, the disturbance indication provided in response to the assistance request being provided to the monitored system. The disturbance request may further include an indication of how much the output data from the monitored system is disturbed in response the assistance request. The disturbance indication may further include an indication of a type of assistance requested by the monitoring system. The monitoring system and the monitored system may both be implemented together on a single integrated circuit. The assistance request may further include a request to communicate externally through the monitored system.

FIG. 1 illustrates a simplified data processing system 10 in accordance with an embodiment. Data processing system 10 may be implemented on a single integrated circuit (IC) or on multiple ICs. Data processing system 10 may be a system-on-a-chip (SoC). In one embodiment, data processing system 10 is an SoC for use in an internet-of-things (IoT) application. Data processing system 10 includes monitoring system 11 and monitored system 12. Monitoring system 11 includes processor 14 and data analysis block 16. Data analysis block 16 includes ML block 18. Monitored system 12 includes processor 20, security block 22, and input/output (I/O) circuit 24. In an actual implementation, data processing system 10 would include additional blocks or circuits not shown in FIG. 1. For example, data processing system 10 may include various peripherals depending on the application. The peripherals may include, for example, a UART (universal asynchronous receiver transmitter) module, a CAN (controller area network) module, a direct memory access (DMA) module, a phase locked loop (PLL), a graphics processor, various sensors, one or more timers, etc.

In operation, monitored system 12 may provide functionality for an IoT system, such as for example, an edge node or IoT device. For example, monitored system 12 may provide communication with a server located in the "cloud." Monitoring system 11 monitors the operations of monitored system 12. Specifically, monitoring system 11 is coupled to receive output data labeled "DATA" and provide the DATA to data analysis block 16. Data analysis block 16 includes ML model 18. In one embodiment, ML model 18 is trained on the DATA from monitored system 12 using, for example, supervised learning, unsupervised learning, semi-supervised learning, or reinforcement learning. In another embodiment, ML model 18 may be trained differently. ML model 18 may include a classification algorithm such as a support vector machine (SVM) algorithm or a neural network (NN) algorithm. Once trained, ML model 18 is used to analyze the output data from monitored system 12 during an inference phase. The output data may include information regarding the operation of processor 20. For example, ML model 18 may receive and analyze information such as cache refills, instructions, exceptions, missed branch predictions, loads and stores to memory, error correction operation, access permission violations, etc. The analysis may be used to generate a summary of results. The summary of results may then be provided to an external service.

During the analysis, monitoring system 11 may require access to a function or system of monitored system 12. As an example, data analysis block 16 may need to communicate with a system external to data processing system 10 labeled "OTHER SYSTEM" in FIG. 1. For example, to send the summary of results to the external service, monitoring system 11 may need to communicate externally using resources from monitored system 12. The communication may be over the internet. The summary of results may need to be communicated to, for example, a configuration service, recovery service, or an update service. In the illustrated embodiment, monitoring system 11 does not have control over a communication port for external communications. To accomplish the external communication, processor 14 of monitoring system 11 provides a request for assistance, labeled "ASSISTANCE REQUEST," from monitoring system 11 to monitored system 12. However, requesting and receiving assistance from monitored system 12 while monitoring the operation of monitored system 12 may adversely influence the output data (DATA) received from monitored system 12 and potentially change the analysis results generated by data analysis block 16. To mitigate the effects of the assistance request, in accordance with an embodiment, processor 14 provides a disturbance indication labeled "DISTURBANCE INDICATION" to data analysis block 16. Data analysis block 16 may then modify the monitoring operation to factor in the disturbance in the received data. For example, data analysis block 16 may ignore DATA received during an observation period around assertion of the DISTURBANCE INDICATION or reduce a weight applied to the DATA. The DISTURBANCE INDICATION may be a binary value (zero or one). Alternately, the DISTURBANCE INDICATION may be a value between zero and one to indicate a percentage of the corresponding observation period that the DATA was potentially disturbed. For example, 0.3 may mean the DATA was disturbed during 30 percent of the observation period and the weight given the DATA can be adjusted. Also, if processor 14 can make several different types of assistance requests causing several different types of disturbances, then each disturbance may get its own unique DISTURBANCE INDICATION. Additional bits may be added to DISTURBANCE INDICATION to provide the unique disturbance indication for each of the different types of assistance.

Security block 22 may provide various security services to data processing system 10. For example, security block 22 may provide encryption and decryption of data provided externally through I/O 24. Also, security block 22 may include, e.g., a secure memory for storing sensitive information such as encryption/decryption keys, secure processing, secure boot functionality, random number generation, etc.

Figure 2:
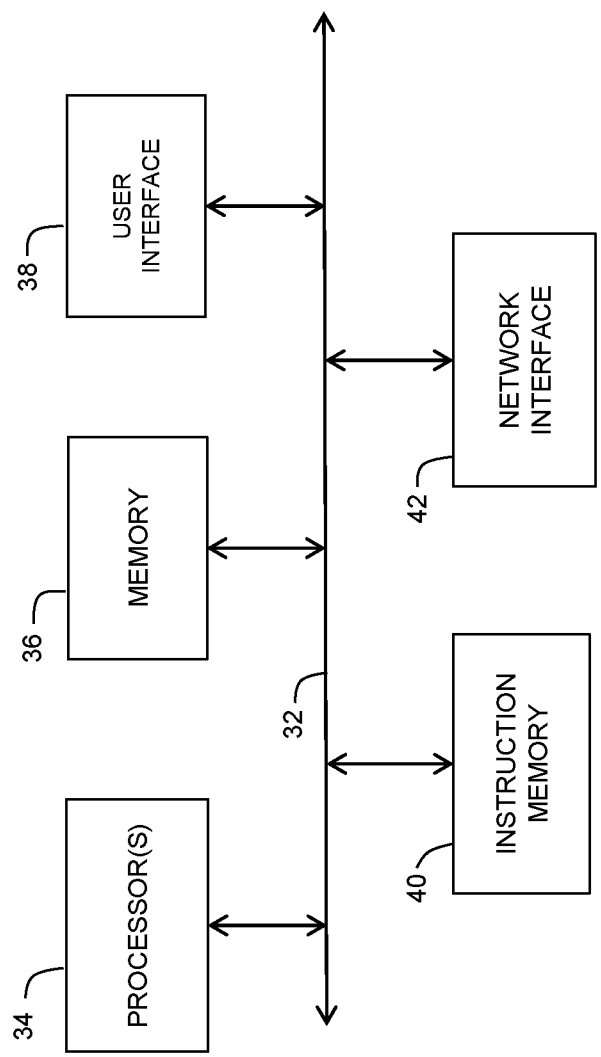
FIG. 2 illustrates a hardware system useful for implementing the data processing system of FIG. 1.

FIG. 2 illustrates hardware system 30 useful for implementing data processing system 10 of FIG. 1. Hardware system 30 may be implemented on one or more ICs and may be used in an implementation of the described embodiments. Hardware system 30 includes bus 32. Connected to bus 32 is processor(s) 34, memory 36, user interface 38, instruction memory 40, and network interface 42. Processor(s) 34 may be any hardware device capable of executing instructions stored in memory 36 or instruction memory 40. For example, processor 34 may execute the machine learning algorithm for ML model 18. Processor(s) 34 may have multiple processing cores. Processor 34 may be, for example, a microprocessor, field programmable gate array (FPGA), application-specific integrated circuit (ASIC), or similar device. Processor 34 may be implemented in a secure hardware element and may be tamper resistant. Processors 14 and 20 of FIG. 1 may be implemented using one or more of processor(s) 34.

Memory 36 may be any kind of memory, such as for example, L1, L2, or L3 cache or system memory. Memory 36 may include volatile memory such as static random-access memory (SRAM) or dynamic RAM (DRAM), or may include non-volatile memory such as flash memory, read only memory (ROM), or other volatile or non-volatile memory. Also, memory 36 may be implemented in a secure hardware element of security block 22 (FIG. 1). Alternately, memory 36 may be a hard drive implemented externally to hardware system 30 (not shown). In one embodiment, memory 36 is used to store weight matrices for ML model 18.

User interface 38 may be connected to one or more devices for enabling communication with a user such as an administrator. For example, user interface 38 may be enabled for coupling to a display, a mouse, a keyboard, or other input/output device. Network interface 42 may include one or more devices for enabling communication with other hardware devices such as, e.g., I/O 24 in FIG. 1. For example, network interface 42 may include, or be coupled to, a network interface card (NIC) configured to communicate according to the Ethernet protocol. Also, network interface 42 may implement a TCP/IP stack for communication according to the TCP/IP protocols. Data samples for classification may be input via network interface 42, or similar interface. Various other hardware or configurations for communicating are available.

Instruction memory 40 may include one or more machine-readable storage media for storing instructions for execution by processor(s) 34. In other embodiments, both memories 36 and 40 may store data upon which processor(s) 34 may operate. Memories 36 and 40 may also store, for example, encryption, decryption, and verification applications. Memories 36 and 40 may be implemented in a secure hardware element of security block 22 and may be tamper resistant.

Figure 3:
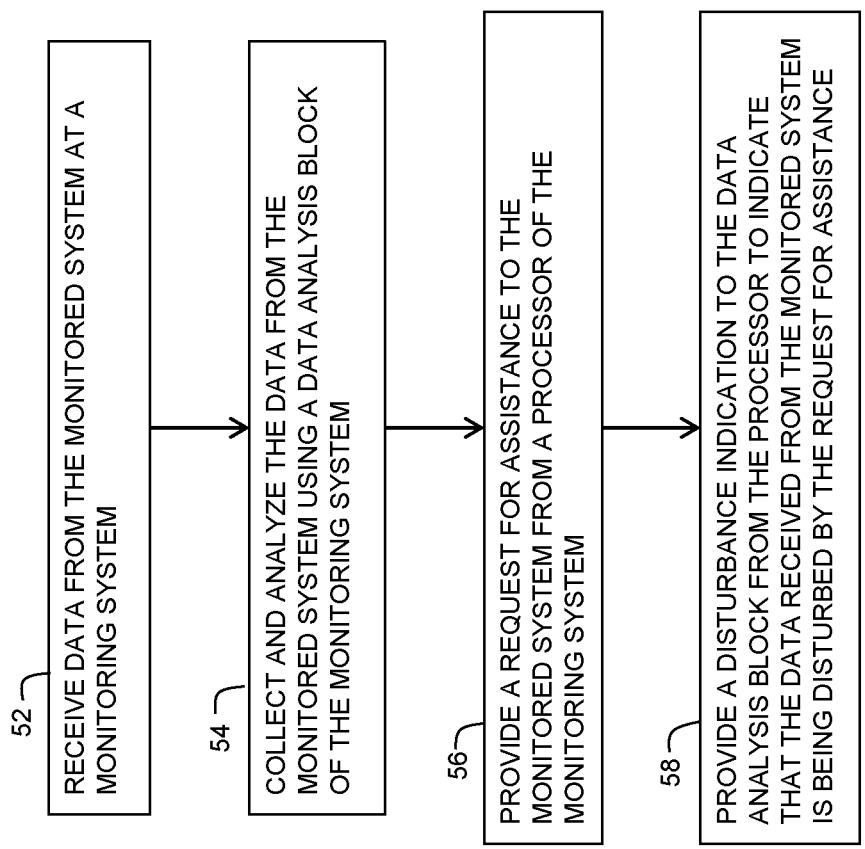
FIG. 3 illustrates a flow chart of a method for monitoring a monitored system in accordance with an embodiment.

FIG. 3 illustrates a flow chart of method 50 for monitoring monitored system 12 in accordance with an embodiment. Referring to both FIG. 3 and FIG. 1, method 50 begins at step 52. At step 52, data is received by monitoring system 11 from monitored system 12. In one embodiment, monitoring system 11 includes ML model 18 and the data is used to train ML model 18 during a training phase of operation. Monitored system 21 and monitoring system 11 may be part of the same SoC for use in an IoT application. At step 54, the data is collected and analyzed by data analysis block 14. The analysis is performed, at least in part, by ML model 18. During the analysis, monitoring system 11 may require the assistance of monitored system 12. For example, monitoring system 11 may require use of a resource of monitored system 12. In one embodiment, monitoring system 11 may need to communicate with a system external to data processing system 10, and monitored system 12 controls external communications. When the assistance is requested by processor 14, processor 14 also provides a disturbance indication, at step 58, to data analysis block 16. Data analysis block 16 can then take steps to mitigate the effects of the disturbance as previously discussed in the description of FIG. 1. By providing the disturbance indication when data is being received for analysis, the accuracy of the results of the analysis can be improved by taking an action that will reduce the effect of the disturbance. For example, the weight given the data may be reduced for the observation period.

Figure 4:
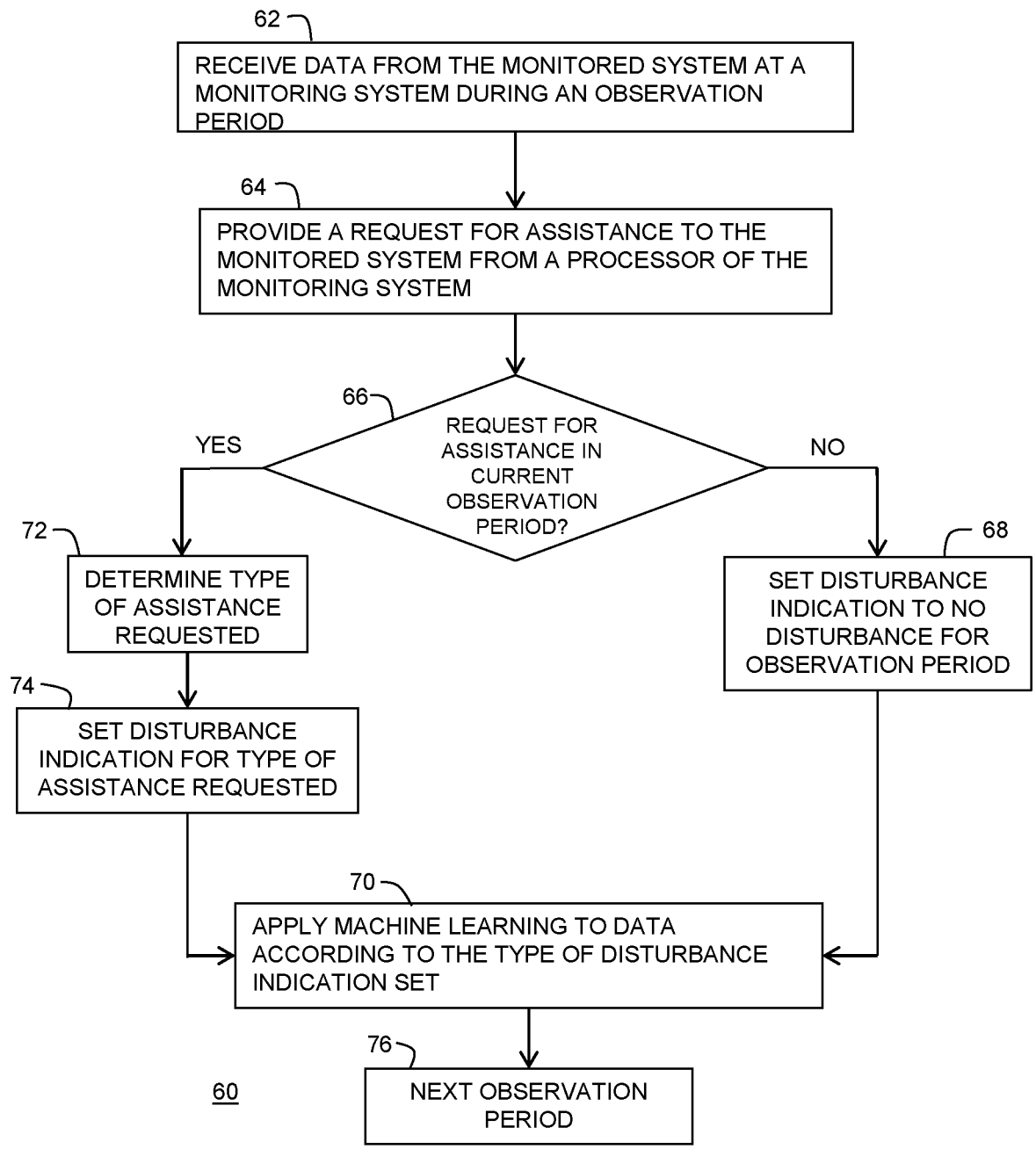
FIG. 4 illustrates a flow chart of a method for monitoring a monitored system in accordance with another embodiment.

FIG. 4 illustrates a flow chart of method 60 for monitoring monitored system 12 in accordance with another embodiment. Method 60 begins at step 62. At step 62, data (labeled DATA in FIG. 1) is received from monitored system 12 by monitoring system 11 during an observation, or sampling, period. In monitoring system 11, data analysis block 16 analyses the data using ML model 18 during inference operation of ML model 18. In one embodiment, the data may also be used to train ML model 18. At step 64, processor 14 of monitoring system 11 provides a request for assistance to monitored system 12. At decision step 66, it is determined if the request for assistance was provided within the current observation period. If the request for assistance was not provided within the current observation period, the NO path is taken to step 68 and a disturbance indication is set to indicate no disturbance. In one embodiment, the disturbance indication is a flag set with a logic state in a register file (not shown) of processor 14. For example, a logic one may indicate a disturbance and a logic zero may indicate no disturbance. However, if at decision step 66, there was a request for assistance during the current observation period, then the YES path is data to step 72, and it is determined what type of assistance is requested. There can be many types of assistance monitoring system 11 may require from monitored system 12. For example, monitoring system 11 may need to communicate with another system external to data processing system 10 and monitored system 12 may control external communications from data processing system 10. In another embodiment, monitoring system 11 may need assistance from monitored system 12 to, e.g., access a memory for storing data, such as in a non-volatile memory. Alternately, monitoring system 11 may need assistance or resources to compress and then store the resulting compressed data in a memory. A unique disturbance indication may be provided for each type of assistance that can be requested. The disturbance indication may include additional bits to indicate the type. If necessary, a different response can be provided for each type of disturbance. At step 74, a disturbance indication for the type of assistance requested is set. Both steps 68 and 74 proceed to step 70. At step 70, machine learning is applied to the data according to the type of disturbance indication set. Then a next, or subsequent observation period is entered and method 60 begins again at step 62.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising a monitoring system, the monitoring system comprising:
   a processor for executing a monitoring application for monitoring an operation of a monitored system coupled to the monitoring system, the processor having an output coupled to the monitored system for providing an assistance request; and
   a data analysis block having a machine learning model coupled to receive output data from the monitored system for training the machine learning model to analyze the monitored system for abnormal behavior occurring during normal operation of the monitored system, the machine learning model coupled to receive a disturbance indication from the processor, wherein the disturbance indication is provided to the machine learning model in response to the processor providing the assistance request to the monitored system during the training of the machine learning model, wherein the disturbance indication indicating that the output data from the monitored system is being disturbed by the assistance request during an observation period of the output data, and wherein a weight of the output data is adjusted during the observation period of the output data.

2. The monitoring system of claim 1, wherein the disturbance indication further comprises an indication indicating how much the output data is being disturbed.

3. The monitoring system of claim 2, wherein the indication indicating how much the output data is being disturbed further comprises an indication indicating how much of an observation period of the output data that the output data is being disturbed.

4. The monitoring system of claim 1, wherein the machine learning model, the disturbance indication is receivable by the machine learning model during both a training phase and an inference phase of the machine learning model.

5. The monitoring system of claim 1, wherein the monitoring system and the monitored system are both implemented together on a single integrated circuit.

6. The monitoring system of claim 1, wherein the disturbance indication further comprises an indication of a type of assistance requested by the monitoring system.

7. The monitoring system of claim 1, wherein the assistance request comprises a request to communicate externally from the monitored system through an input/output circuit of the monitored system.

8. The monitoring system of claim 7, wherein the external communications from the monitored system are encrypted.

9. A method for monitoring operation of a system, the method comprising:
   receiving data from the monitored system at a monitoring system;
   collecting and analyzing the data from the monitored system using a data analysis block of the monitoring system, the data analysis block including a machine learning model;
   training the machine learning model to analyze the monitored system for abnormal behavior occurring during normal operation of the monitored system using the data;
   providing a request for assistance to the monitored system from a processor of the monitoring system during an observation period of the data by the machine learning model;
   providing a disturbance indication to the machine learning model from the processor in response to the request for assistance being provided to the monitored system, the disturbance indication to indicate that the data received from the monitored system is being disturbed by the request for assistance during the observation period; and
   adjusting a weight of the data during the observation period of the data.

10. The method of claim 9, wherein the the method further comprising indicating what percentage of the observation period was disturbed by the request for assistance.

11. The method of claim 9, wherein the data includes information about an operation of a processor of the monitored system.

12. The method of claim 9, wherein providing the disturbance indication further comprises providing an indication of how much the data received from the monitored system is being disturbed.

13. The method of claim 9, wherein the disturbance indication further comprises an indication of a type of assistance requested by the monitoring system.

14. The method of claim 9, wherein providing the request for assistance further comprises requesting communications external to the monitoring system through the monitored system.

15. The method of claim 9, wherein the monitored system and the monitoring system are implemented on a single integrated circuit.

16. A data processing system comprising:
   a system for performing a function; and
   a monitoring system coupled to monitor output data from the system for performing the function, the monitoring system comprising:
      a processor having an output for providing an assistance request to the monitored system; and a data analysis block comprising a machine learning model, the machine learning model coupled to receive the output data for training the machine learning model to analyze the monitored system for abnormal behavior occurring during a normal operation of the monitored system, the machine learning model coupled coupled to the processor and coupled to receive a disturbance indication in response to the processor providing the assistance request to the monitored system, disturbance indication from the processor to indicate to the machine learning model that the output data is being disturbed by the assistance request during an observation period of the output data, and wherein a weight of the output data is adjusted during the observation period of the output data.

17. The data processing system of claim 16, wherein the weight of the output data is reduced to lessen any effects of the disturbance on the training of the machine learning model.

18. The data processing system of claim 16, wherein the disturbance indication further comprises an indication of a type of assistance requested by the monitoring system.

19. The data processing system of claim 16, wherein the monitoring system and the monitored system are both implemented together on a single integrated circuit.

20. The data processing system of claim 16, wherein the assistance request further comprises a request to communicate externally through the monitored system.

\* \* \* \* \*